3,770,678
POLYSULFIDE LATEX BASED CAULKING COMPOSITIONS EXHIBITING IMPROVED PHYSICAL PROPERTIES

Henry N. Paul 3rd, Blue Bell, Pa., assignor to Thiokol Chemical Corporation, Bristol, Pa.
No Drawing. Filed Oct. 2, 1972, Ser. No. 294,395
Int. Cl. C08g 43/00, 51/30, 51/04
U.S. Cl. 260—28          8 Claims

ABSTRACT OF THE DISCLOSURE

A polysulfide latex based caulking composition containing (a) a water dispersion of a solid polysulfide polymer having the structure —$(RS_x)_n$—, (b) from 3% to 15% by weight of total polymer solids of a thiol terminated liquid polysulfide polymer having the structure $$HS—(RSS)_n—RSH$$

and (c) special purpose additives.

BACKGROUND OF THE INVENTION

Field of the invention

This invention relates to an improved one-package polysulfide latex caulking composition. More particularly, this invention relates to a one-package polysulfide latex based caulking composition having improved physical properties, good application characteristics, relatively fast drying times, and attractive cost.

Description of the prior art

Polymer latex based caulking compositions are known in the art. They are economically attractive one-package sealant compositions characterized by their excellent application characteristics; i.e., they are readily gunned, troweled, or beaded onto various surfaces. These latex caulks have been extensively used for a variety of coating, caulking, and grouting applications, e.g. sealing panes of glass to window frames, sealing cracks in concrete structures, sealing baseboard and trim seams, sealing around bath tubs, sealing boat hulls, etc. Latex based caulking compositions of the prior art have in general been based upon solvent or water dispersions of such polymers as the polyacrylates, polyvinyl acetates, polysulfides and the like. In addition to the polymer latex, these prior art latex based caulking compositions frequently contained special purpose additives such as fillers, plasticizers, adhesive additives, latex stabilizers, and the like. Polysulfides latex caulking compounds of the prior art occasionally contained a minor proportion of non-latex type liquid polysulfide polymer in addition to the special purpose additives. As is known to those skilled in the art, latex caulks of the above type do not cure in the standard sense. That is, they do not cure through the use of oxidative curing agents or crosslinkers but rather attain their maximum physical properties through solvent or water evaporation and subsequent coalescing of the dispersed polymer particles.

While the latex caulks referred to above have proven useful in certain applications, they all have been found to possess several serious shortcomings. Thus, the prior art latex caulks exhibited relatively low physical properties, moderate to high shrinkage, poor underwater adhesion, poor resistance to rain washout and high cost. In addition to the foregoing disadvantages prior art polysulfide latex caulks often exhibited objectionable odors.

In addition to the latex caulks, 100% solids moisture curable sealants are also in common usage. Two common types are polysulfide and polyurethane based. These sealants have little or no shrinkage, high physical properties, and good resistance to washout prior to ultimate cure. However, they have the disadvantages of slow cure, long "paint-over" times, poor sag resistance, poor blading properties, difficult clean-up problems, poor one-package stability, difficult production problems, erratic adhesion values, and high cost.

The polysulfide latex based caulking compositions of the present invention achieves virtually all of the advantages of the prior art latex caulks (including prior polysulfide latex caulks) and the 100% solids moisture curable one-package caulks but without most of their disadvantages. Thus, the polysulfide latex based caulk of the present invention is an economically priced latex caulk having improved tensile, elongation, adhesion, and sag resistance as well as relatively rapid drying times, short paint over times, adequate room temperature storage stability, and excellent application characteristics. Moreover, the polysulfide latex caulk of the present invention has the further desirable advantage in that it is readily cleaned up with water. This feature is especially attractive in confined areas where solvent odors are objectionable.

Accordingly, it is an object of the present invention to produce an economically priced polysulfide latex based caulking composition having the physical properties normally associated with premium grade latex based or 100% solids based caulks. More particularly, it is an object of the present invention to produce an economically priced polysulfide latex based caulking composition having improved tensile, elongation, adhesion, sag resistance, resistance to rain-washout, application characteristics, and which is readily cleaned up with water and relatively odor free. Further objects of the invention will be readily apparent to those skilled in the art from the detailed description which follows.

SUMMARY OF THE INVENTION

It has been surprisingly and unexpectedly discovered in view of the prior art latex caulks that the objectives set forth above can be accomplished by preparing a polysulfide latex caulking composition consisting essentially of (a) from 85 to 97 parts by weight of total polymer solids of a water dispersion of a solid polysulfide polymer having the structure —$(RS_x)_n$—;
(b) from 3 to 15 parts by weight of total polymer solids of a thiol terminated liquid polysulfide polymer having the structure HS—$(RSS)_n$—RSH; and
(c) from 50 to 300 parts by weight of special purpose additives.

DESCRIPTION OF THE PREFERRED EMBODIMENTS

As indicated above, the polysulfide latex based caulking composition of the present invention is composed of three main components; (1) A polysulfide latex or water dispersion, (2) A thiol liquid polysulfide polymer, and (3) Special purpose additives. As will be described hereinafter, the selection of materials for each component is critical in obtaining the improved physical properties exhibited by the finished polysulfide latex based caulking composition of the present invention.

1. The polysulfide latex.—Polysulfide polymer latices or water dispersions have been known in the art. These prior art water dispersions were based on solid polysulfide polymers having the general formula —(RSS)$_x$—. As the general formula indicates, these polymers do not contain active terminals and do not respond to vulcanization with oxidizing agents. Chemically, these polymers are defined as condensation products of an alkaline polysulfide and suitable polyhalides. Prior art polysulfide latices and their method of preparation are described in an article by Fettes and Jorczak, Industrial and Engineering Chemistry, volume 42, November 1950, page 2217; also see the article by Bertozzi in Rubber Chemistry and Technology, volume 41, No. 1, February 1968, page 157. Examples of the above type polysulfide latices are those designated MX and WD-6 in the article by Bertozzi referred to above. These type polysulfide latices have been employed in a variety of coating applications in the past and also in early prior art polysulfide latex based caulking compositions.

While polysulfide latices of the above type may be useful in the caulking compositions of the present invention, they are not especially favored due to their unattractive economics and their tendency to impart objectionable odors to the finished caulking composition. Accordingly, a special polysulfide latex designed to be economically attractive and relatively odor-free is especially preferred for use as the polysulfide latex component of the present caulking composition. This special polysulfide latex is prepared by reacting a 20% excess of an alkaline polysulfide, preferably sodium polysulfide, with a bis-2-chloroethyl formal employing reaction conditions, techniques, and procedures known to those skilled in the art to form a solid polysulfide polymer having the general structure —(RS$_x$)$_n$— wherein R is the ethylene formal radical $CH_2CH_2O—CH_2—O—CH_2—CH_2$, $x=2.2$, $n$=about 500, and said polymer has a molecular weight of about 100,000. The polysulfide polymer water dispersion is generally prepared by reacting the sodium polysulfide and bis-2-chloroethyl formal in situ (e.g. in the water medium) employing procedures which are known to those skilled in the art.

The polysulfide latex component of the present invention may be employed in amounts of from 85 to 97 parts by weight based up 100 parts by weight of total polymer solids in the finished caulking composition.

(2) The thiol terminated liquid polysulfide polymer

The thiol terminated liquid polysulfide polymers (hereinafter referred to as liquid polythiol polymers) which may be employed in the polysulfide latex based caulking composition of the present invention are those liquid polythiol polymers having the structure HS—(RSS)$_n$—RSH wherein R may be a hydrocarbon, oxahydrocarbon, or thiahydrocarbon radical and $n$ may vary from 10 to 70. Liquid polythiol polymers of the above structure and their method of preparation are disclosed in U.S. 2,466,963. Liquid polythiol polymers of the above structure in general have molecular weights of from about 500 to about 25,000 or even higher. However, it has been found in the practice of the present invention that liquid polythiol polymers having molecular weights of below about 2,500 or above about 10,000 provide very little or only slight improvement in the properties of the finished caulking composition and are therefore not favored. Accordingly, liquid polythiol polymers of the above structure having molecular weights of about 2,500 to about 10,000 are especially preferred for use in the present compositions. The quantities of the preferred liquid polythiol polymers which can be employed in the present caulking composition have been found to be critical to the attainment of optimum physical properties in the finished composition.

Thus, it has been found that the preferred liquid polythiol polymers must be employed in amounts of from 3 to 15 parts by weight, preferably 5 to 10 parts by weight; based upon 100 parts by weight of polymer solids in the caulking composition. Amounts of liquid polythiol polymers less than 3 parts by weight or more than 15 parts by weight provide virtually no improvement in properties and in some cases cause a degradation of physical properties.

(3) Special purpose additives

As discussed above, the polysulfide latex based caulking compositions of the present invention may contain special purpose additives such as fillers, plasticizers, latex stabilizers, whiteners and the like. However, some special purpose additives normally used in polysulfide polymer sealant compositions of the prior art have been found to exert adverse effects on the physical properties of the polysulfide latex based caulking compositions of the present invention. Hence, care must be exercised in the selection of these additives for use in the present caulking compositions. The following special purpose additives may be employed in the caulking composition of the present invention: fillers, such as for example calcium carbonate, clays, and limestone; whiteners, such as titanium dioxide; plasticizers, such as chlorinated biphenyl and chlorinated paraffin as well as mixtures thereof; and a latex stabilizer such as a solution of sodium polyacrylate in water commercially available as Alcogum 5950. The amount and type of the above special purpose additives which may be employed in the caulking composition of the present invention is dependent upon the particular application for which the polysulfide latex based caulking composition is intended, the exact level of physical properties required, the desired application characteristics, and is within the skill of the art. In general, about 50 to 300 parts by weight of such special purpose additives may be employed.

The preparation of the finished polysulfide latex based caulking compositions of the present invention is accomplished by mixing procedures and mixing equipment well known in the polysulfide sealant and caulking art. Thus, in preparing the polysulfide latex component of the caulking composition, conventional latex mixing equipment and procedures may be employed. Similarly, in combining the polysulfide latex, liquid polythiol polymer, and special purpose additives may be mixed in a pony-type mixer or a Baker-Perkins sigma blade type mixer utilizing standard mixing procedures well known in the art. Moreover, the order of addition of ingredients is not critical in preparing the finished caulking composition. For example, the polysulfide latex may be first prepared in standard latex production equipment and the liquid polythiol polymer and special additives may then be combined with the latex in the latex production equipment. Alternatively, the liquid polythiol polymer and the special purpose additives may first be mixed in standard sealant mixing equipment e.g. a Baker-Perkins Mixer, and a previously prepared polysulfide latex then added thereto.

The following examples are submitted to better illustrate the present invention and are not intended as a limitation upon the scope thereof.

EXAMPLE I

Preparation of the polysulfide latex

The polysulfide latex, designated ZW-679 for convenience, is prepared in the following manner.

To a 5 liter flask equipped with a stirrer, condenser, and thermometer is added 1785 cc. (4.52 moles) Na$_2$S$_{2.25}$, 20 cc. of Necal 5% (an alkyl sulfonate), and 17 cc. of a 50% solution of NaOH. The resulting mixture is heated to a temperature of 300° F. for approximately one hour. At this time, 117 cc. of a 25% water-white solution of MgCl$_2$ is added to the mixture with stirring. Then 3.996 moles of bis-2-chloroethyl formal and .0004 mole of trichloropropane were added to the mixture. The above mixture was then heated for one hour at temperatures of 212° F.–215° F.

The resulting latex is then concentrated and subjected to several washings in known manner.

EXAMPLE II

Preparation of a polysulfide latex based caulking composition

A polysulfide latex based caulking composition was prepared employing the formulation shown below:

| Ingredients: | Parts by weight |
|---|---|
| ZW-679 polysulfide latex, 60% solids [1] | 167.0 |
| Duramite (calcium carbonate) | 20.0 |
| Suprex clay | 20.0 |
| Cereclor 51L (chlorinated paraffin plasticizer) | 30.0 |
| | 237.0 |

[1] ZW-679 is a polysulfide polymer latex prepared in the manner described in Example I by reacting a 20% excess of sodium polysulfide with bis-2-chlorethyl formal to produce a polysulfide polymer having no crosslinking and a sulfur rank of 2.25.

The above polysulfide latex based caulking composition was employed as a control in Examples 3–5 which follow. In preparing the above control formulation the calcium carbonate, clay, and chlorinated paraffin plasticizer were added to a pony-type mixer in the amounts shown and mixed until a stiff paste was obtained. The ZW-679 polysulfide latex was then added to the mixture.

EXAMPLES III–V

Evaluation of the effect of minor amounts of liquid polythiol polymer on the physical properties of a polysulfide latex based caulking composition In this evaluation, the physical properties of the control formulation of Example II were compared to compositions based on the control formulation but containing 5 parts and 10 parts by weight of a liquid polythiol polymer. The test formulations were prepared in similar manner to the control except that the liquid polythiol polymer, calcium carbonate, clay, and chlorinated paraffin plasticizer were admixed prior to addition of the ZW-679 polysulfide latex. Test results are shown in Table I.

The formulations evaluated were as follows:

| | Parts by weight | | |
|---|---|---|---|
| Example number | 3[1] | 4 | 5 |
| Ingredients: | | | |
| ZW-679 polysulfide latex, 60% solids | 167.0 | 158.0 | 150.0 |
| LP-2 liquid polysulfide polymer | | 5.0 | 10.0 |
| Duramite (calcium carbonate) | 20.0 | 20.0 | 20.0 |
| Suprex clay | 20.0 | 20.0 | 20.0 |
| Cereclor 51L (chlorinated parrafin) | 30.0 | 30.0 | 30.0 |
| Total | 237.0 | 233.0 | 230.0 |

[1] Control.

TABLE I

| Example number | 3 | 4 | 5 |
|---|---|---|---|
| Properties: | | | |
| Knifing | Fair | Fair | Fair |
| Gunnability | Fair | Fair | Fair |
| Durometer (Shore A) | 29 | 23 | 22 |
| 100% modulus, p.s.i. | | 48 | 50 |
| Tensile, p.s.i. | 40 | 75 | 78 |
| Elongation, percent | 200 | 770 | 760 |
| Dry times: | | | |
| Set to touch, min | 15 | 15 | 15 |
| Paint over time, min | 40 | 30 | 30 |
| Through dry, min | 100 | 90 | 90 |
| Color | (1) | (1) | (1) |

[1] Beige.

As can be seen from the above data, the addition of a minor amount of a liquid polythiol polymer to the polysulfide latex base caulk results in a considerable improvement in physical properties.

EXAMPLES VI–VIII

Evaluation of other liquid polythiol polymers in the polysulfide latex based caulking composition of the present invention These examples illustrate the use of various liquid polythiol polymers in the composition of the present invention. Mixing and test procedures were substantially the same as those employed in Examples 2–5.

| | Parts by weight | | |
|---|---|---|---|
| Example number | 6 | 7 | 8 |
| Ingredients: | | | |
| ZW-679 polysulfide latex, 60% solids | 158.0 | 158.0 | 158.0 |
| LP-2 liquid polysulfide polymer | 5.0 | | |
| LP-32 liquid polysulfide polymer [1] | | 5.0 | |
| LP-31 liquid polysulfide polymer [2] | | | 5.0 |
| Duramite (calcium carbonate) | 20.0 | 20.0 | 20.0 |
| Suprex clay | 20.0 | 20.0 | 20.0 |
| Cereclor 51 L (chlorinated paraffin) | 30.0 | 30.0 | 30.0 |
| Total | 233.0 | 233.0 | 233.0 |

[1] LP-32 is a liquid polythiol polymer having essentially the structure $HS-(C_2H_4-O-CH_2-O-C_2H_4-SS)_{23}-C_2H_4-O-CH_2-O-C_2H_4-SH$ with about 0.5% crosslinking and a molecular weight of about 4,000.

[2] LP-31 is a liquid polythiol polymer having essentially the structure $HS-(C_2H_4-O-CH_2-O-C_2H_4-SS)_{42}-C_2H_4=O-CH_2-O-C_2H_4-SH$ with about 0.5% crosslinking and a molecular weight of about 7,000.

Test results are shown in Table II below:

TABLE II

| Example number | 6 | 7 | 8 |
|---|---|---|---|
| Physical properties: | | | |
| Knifing | Fair | Fair | Fair |
| Gunnability | Fair | Fair | Fair |
| Durometer (Shore A) | 23 | 30 | 25 |
| 100% modulus, p.s.i. | 48 | 100 | 50 |
| Tensile, p.s.i. | 75 | 150 | 78 |
| Elongation, percent | 770 | 400 | 750 |

EXAMPLE IX

The effect of variations in the type and amount of special purpose additives on the physical properties of the polysulfide latex caulking composition In this evaluation, the effect of varying the amounts of fillers, the use of mixed plasticizers, and the addition of a latex stabilizer on the physical properties of the polysulfide latex based caulking composition was determined. The test formulation is shown below.

Test results are shown in Table III.

| Ingredients: | Parts by weight |
|---|---|
| ZW-679 polysulfide latex, 65% solids | 150.0 |
| LP-2 liquid polysulfide polymer | 5.0 |
| Duramite (calcium carbonate) | 81.0 |
| Cereclor 51 L/Aroclor 5442 [1] | 57.0 |
| TiO$_2$ | 12.0 |
| Alcogum 5950 [2] (latex stabilizer) | 10.0 |
| Total | 315.0 |

[1] A mixture of chlorinated paraffin (Cereclor 51L) and chlorinated terphenyl (Aroclor 5442) in a ratio of 1:1.

[2] Alcogum 5950 is 11% solution of sodium polyacrylate in water.

TABLE III

| Physical properties: | |
|---|---|
| Knifing | Excellent |
| Gunnability | Excellent |
| Durometer (Shore A) | 31 |
| 100% modulus, p.s.i. | 68 |
| Tensile, p.s.i. | 81 |
| Elongation, percent | 700 |
| Dry times: | |
| Set to touch, minutes | 20–30 |
| Paint over time, minutes | 60 |
| Through dry, hours | 24–48 |
| Color | White |

Comparing the physical properties of the above test formulation with the physical properties of earlier examples, e.g. Examples 4 and 5, it can be seen that the amount and type of special purpose additives exert a significant effect on physical properties. In this case, the physical properties are well within commercial acceptance limits and in some respects are improved over earlier formulations.

I claim:
1. A polysulfide latex based caulking composition consisting essentially of:
   (a) from about 85 to about 97 parts by weight per 100 parts by weight of total polymer solids in the composition of a polysulfide polymer in the form of a water dispersion, said polysulfide polymer having a molecular weight of about 100,000 with no crosslinking and having the structure $—(RS_x)_n—$, wherein R is the ethylene formal radical

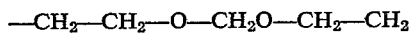
   $$—CH_2—CH_2—O—CH_2O—CH_2—CH_2$$

X is from 2.20 to 2.30, and $n$ is about 500;
   (b) from about 3 to 15 parts by weight per 100 parts by weight of total polymer solids in the composition of a liquid polythiol polymer having a molecular weight in the range of from about 2,500 to about 10,000 and having the structure $HS—(RSS)_n—RSH$, wherein R is selected from the group consisting of hydrocarbon, oxahydrocarbon, and thiahydrocarbon radicals, and $n$ may vary from 10 to 70; and
   (c) from about 50 to about 300 parts by weight per 100 parts by weight of total polymer solids in the composition of special purpose additives selected from the group consisting of fillers, plasticizers, whiteners, adhesive additives, and latex stabilizers.

2. The composition of claim 1 wherein the polysulfide polymer (a) is present in an amount of from 90 to 95 parts by weight per 100 parts by weight of total polymer solids in the composition.

3. The composition of claim 1 wherein the liquid polythiol polymer (b) is present in an amount of from 5 to 10 parts by weight per 100 parts by weight of total polymer solids in the composition.

4. The composition of claim 1 wherein the liquid polythiol polymer (b) has the structure

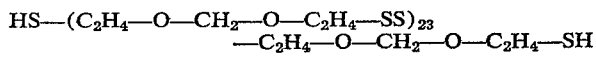
$$HS—(C_2H_4—O—CH_2—O—C_2H_4—SS)_{23}$$
$$—C_2H_4—O—CH_2—O—C_2H_4—SH$$

with about 0.5% crosslinking and a molecular weight of about 4,000.

5. The composition as in claim 1 wherein the fillers are selected from the group consisting of calcium carbonate, clay, and limestone.

6. The composition as in claim 1 wherein the plasticizers are selected from the group consisting of chlorinated biphenyl, chlorinated paraffin, and mixtures thereof.

7. The composition as in claim 1 wherein the whitener is titanium dioxide.

8. The composition as in claim 1 wherein the latex stabilizer is sodium polyacrylate.

References Cited
UNITED STATES PATENTS

| | | | |
|---|---|---|---|
| 2,465,512 | 3/1949 | Carasso | 260—29.2 R |
| 3,316,194 | 4/1967 | Payne et al. | 260—823 |
| 3,505,254 | 4/1970 | Kidwell et al. | 260—823 |

MORRIS LIEBMAN, Primary Examiner

S. L. FOX, Assistant Examiner

U.S. Cl. X.R.

260—29.2 R, 33.8 R, 823, 37